United States Patent [19]
Enomoto

[11] Patent Number: 5,211,348
[45] Date of Patent: May 18, 1993

[54] PHOTOGRAPHIC FILM CASSETTE

[75] Inventor: Masahiro Enomoto, Kanagawa, Japan

[73] Assignee: Fuji Photo Film Co., Ltd., Kanagawa, Japan

[21] Appl. No.: 826,966

[22] Filed: Jan. 28, 1992

[30] Foreign Application Priority Data

Jan. 28, 1991 [JP] Japan .................................. 3-26852

[51] Int. Cl.$^5$ .............................................. G03B 17/26
[52] U.S. Cl. .................................... 242/71.1; 354/275
[58] Field of Search ................... 242/71.1, 71.2, 71.8, 242/71.9; 354/275

[56] References Cited

U.S. PATENT DOCUMENTS

| | | | |
|---|---|---|---|
| 4,834,306 | 5/1989 | Robertson et al. | 242/71.1 |
| 4,848,693 | 7/1989 | Robertson | 242/71.1 |
| 4,938,429 | 7/1990 | Robertson et al. | 242/71.1 |
| 4,962,401 | 10/1990 | Takahashi | 354/275 |
| 5,083,721 | 1/1992 | Okutsu et al. | 242/71.1 |

Primary Examiner—John M. Jillions
Attorney, Agent, or Firm—Sughrue, Mion, Zinn, Macpeak & Seas

[57] ABSTRACT

A photographic film cassette has a photographic film leader, which is advanced outwardly from a cassette shell when a spool is rotated. The spool has two flanges, of which a first one is loosely fitted on a core of the spool. A circumferential lip projects from an inside surface of the first flange toward a photographic filmstrip, contacts on a lateral side of a roll of the filmstrip, and prevents the roll from loosening. The first flange together with the lip is formed according to thermoforming from a sheet of thermoplastic resin having a melt index of 4 or less so as to have a high intensity, and has a thickness of 0.4 mm or less so as to be deformable with a small force.

26 Claims, 7 Drawing Sheets

PHOTOGRAPHIC FILM CASSETTE

BACKGROUND OF THE INVENTION

The present invention relates to a photographic film cassette and, more particularly, to an improved photographic film cassette in which the rotation of the core of a spool causes a photographic film leader to advance to the outside of the cassette shell.

A known photographic film cassette includes a photographic filmstrip positioned so that a photographic film leader does not protrude from a cassette shell prior to loading the cassette into a camera. Such a cassette is easily loaded into the camera. Simple film-advancing mechanisms of the camera are used with this type of cassette and include a construction which rotates the core of a spool to unwind the filmstrip, thereby causing the leader to move through a photographic film passageway and protrude from the cassette. In this construction, a roll of the filmstrip wound about the core is prevented from loosening in order to transmit rotation of the core to the leader. A cassette disclosed in U.S. Pat. Nos. 4,834,306 and 4,848,693 has a spool provided with such disks or flanges on both lateral sides of the roll that circumferential lips are formed on the periphery of the flanges to project in the direction along the length of the cassette. Spreaders or guide projections are formed on the inside of the cassette shell in the positions between the film passageway and a photographic film chamber of the cassette shell for deforming the flanges outwardly to widen the interval between the flanges. The spreaders constantly spread the flanges so as to release the outermost turn of the roll from contact with the circumferential lips.

In order to produce the core and the flanges, using resin is very favorable since it is convenient and inexpensive. Due to deformation of the flanges, it is necessary for ensuring an unfailing advancement of the leader, with only a small torque applied to the core, to construct the flanges and the circumferential lips with a small thickness, e.g., 0.4 mm or below.

Such resinous flanges which are formed so as to have a small thickness for use in the cassettes are disadvantageous in that they exhibit low moldability and low efficiency during mass production, because the resin suitable for the present purposes has a high intensity and thus low flowability. To mold such flanges having a small thickness but a high intensity from resin according to injection molding, the cost for manufacturing the cassettes becomes too high.

SUMMARY OF THE INVENTION

In view of the foregoing problems, an object of the present invention is to provide a photographic film cassette of the leader-advancing type which can be produced inexpensively, and in which a photographic film leader can be advanced even with a comparatively small torque applied to a core of the spool.

In order to achieve the above and other objects and advantages of this invention, a spool of a leader-advancing type photographic film cassette has two flanges, of which a first one is loosely fitted on a core of the spool, whereas a circumferential lip projects from an inside surface of the first flange toward a photographic filmstrip for contact with a lateral side of a roll of the filmstrip so as to prevent the roll from loosening. Further, the first flange together with the lip is formed according to thermoforming from a sheet of thermoplastic resin having a melt index of 4 or less to have a high intensity, and has a thickness of 0.4 mm or less to be deformable with a small force.

In accordance with the present invention, at least one of the two flanges has the thickness of 0.4 mm or less, so that the leader can be advanced outside the cassette shell during rotation of the spool even by applying a small torque thereto. The first flange is formed according to thermoforming from the resinous sheet, which is advantageous in that it results in a high formability for the flange, and is highly suitable for mass production of the cassette, so that the cost of manufacturing the cassette can be reduced.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
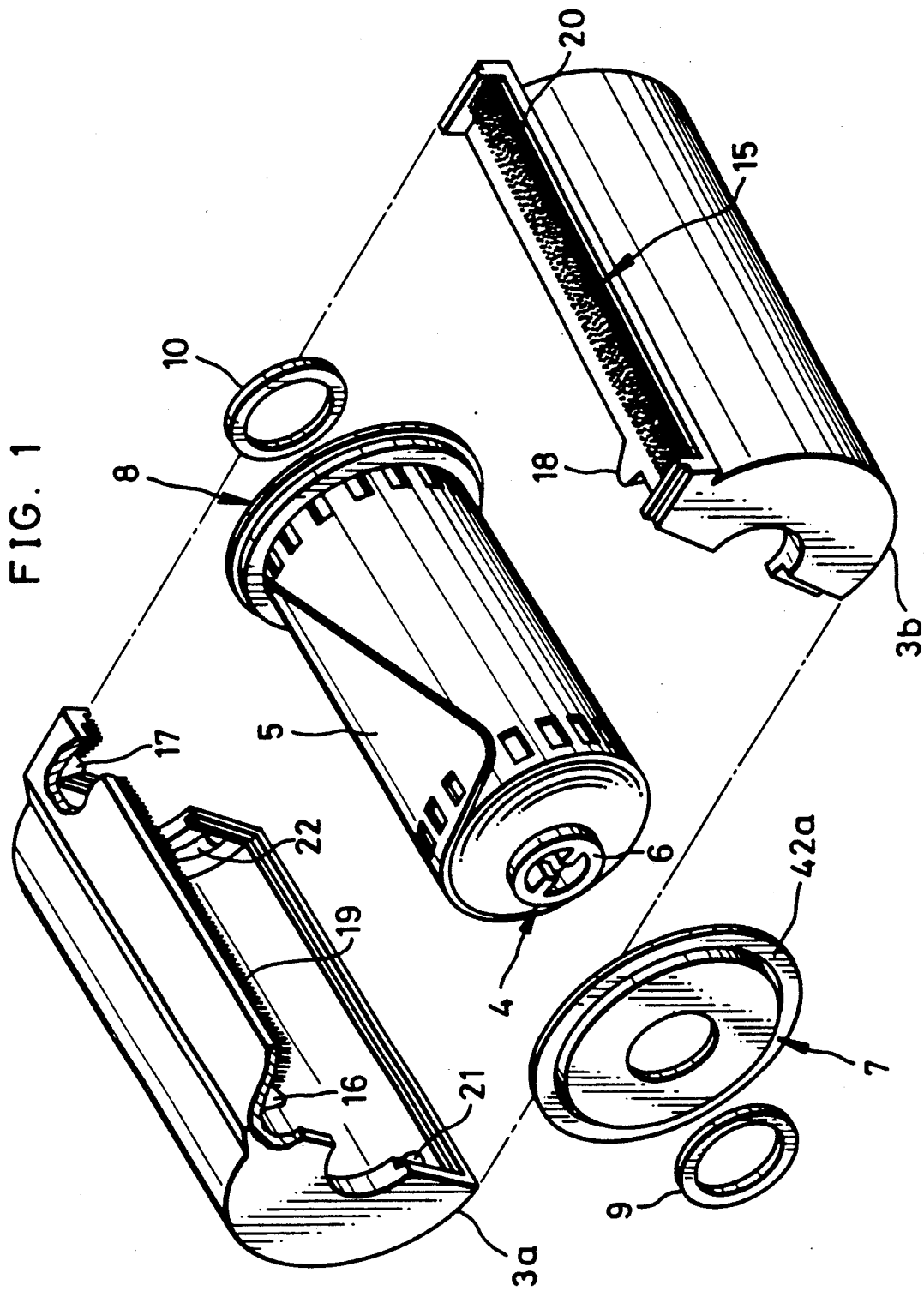
FIG. 1 is an exploded perspective view illustrating a photographic film cassette according to the present invention.
Figure 2:
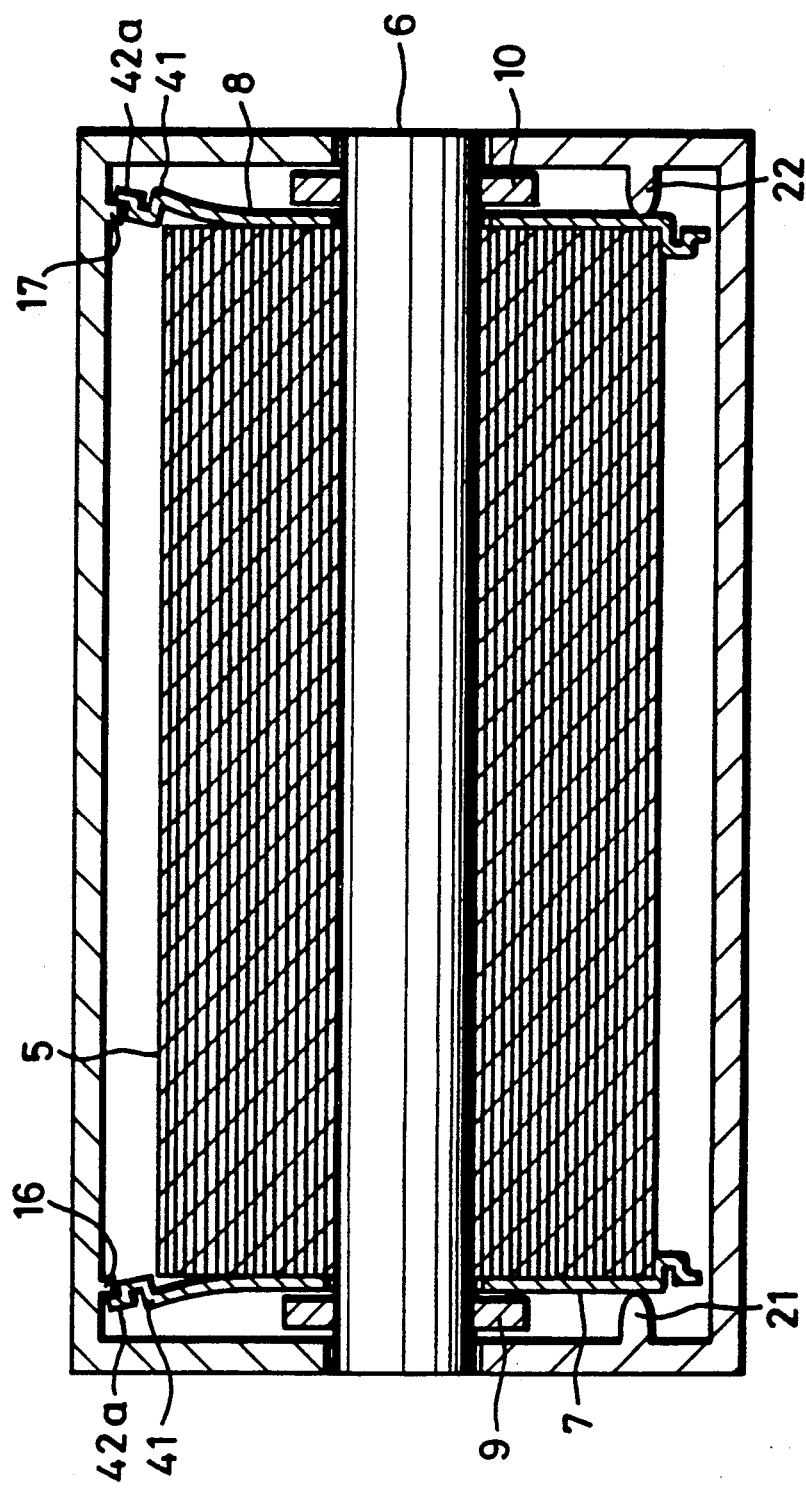
FIG. 2 is a vertical section illustrating the cassette illustrated in FIG. 1.

In FIGS. 1 and 2 illustrating an inventive photographic film cassette, a cassette shell is constituted of two shell halves 3a and 3b molded from resin. The cassette is composed of the cassette shell, a spool 4 and a photographic filmstrip 5 wound on the spool 4 in a roll. The spool 4 is formed by a core 6 and a pair of disks or flanges 7 and 8 loosely fitted thereon. On the outside of the flanges 7 and 8, the core 6 is provided with rings 9 and 10 fitted thereon for preventing light from being incident on the roll of the filmstrip through the gaps between the core 6 and the flanges 7 and 8.

Between the shell halves 3a and 3b is formed a photographic film passageway 15 for passing the filmstrip therethrough. On the shell half 3b is formed a separating claw 18 between the passageway 15 and a photographic film chamber of the cassette shell, which claw abuts on a leading end of the filmstrip 5 to separate it from the inner roll and to guide it to the outside of the cassette shell through the passageway 15. Plush or light-trapping fabric pieces 19 and 20 are attached to the passageway 15 in order to prevent ambient light from entering the film chamber. Arcuate ridges 21 and 22 are formed on the lateral walls of the film chamber for contact with the outside surface of the flanges 7 and 8. The ridges 21 and 22 press the lower portions of the flanges 7 and 8 so as to press the end faces of the roll.

Figure 3:
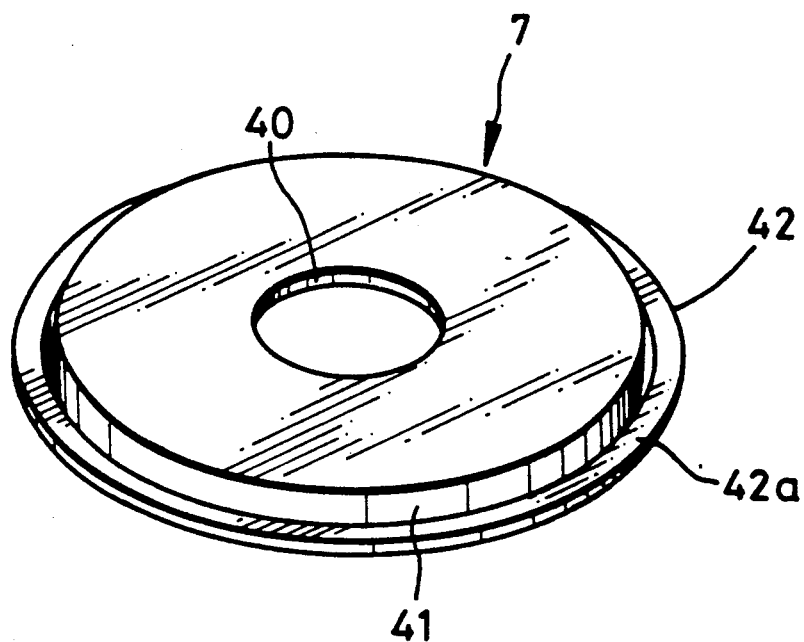
FIG. 3 is a perspective view illustrating a disk or flange of the cassette illustrated in FIG. 1.
Figure 4:
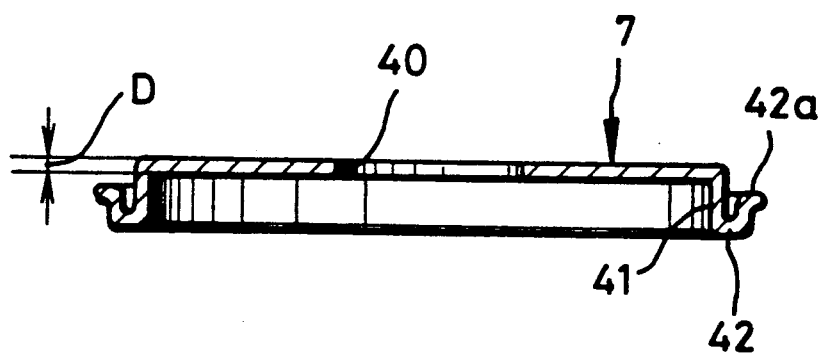
FIG. 4 is a section illustrating the flange illustrated in FIG. 3.

Reference is now made to FIGS. 3 and 4 illustrating an enlarged view of the disk or flange 7. Because the flange 8 is the same as the flange 7, only the flange 7 is described. A hole 40 is formed in the flange 7 at its center for inserting the core 6 therein. A circumferential lip 41 is formed on the circumferential edge of the flange 7 in a vertical direction for contact with a lateral side of the outermost turn of the roll so as to prevent the roll from loosening. The peripheral edge of the lip 41 is provided with a circumferential projection 42 including a collar 42a. The cross section of the lip 41 together with the projection 42 is in the shape of a crank as illustrated in FIG. 4. The surface of the lip 41 to be in contact with the filmstrip 5 is rounded off smoothly, so that the friction between the filmstrip 5 and the lip 41 is kept small.

On the shell half 3a (see FIG. 1) are formed a pair of guide projections or spreaders 16 and 17 in correspondence with the passageway 15 for contact with the collars 42a of the flanges 7 and 8 to spread the lips 41 in the direction along the width of the filmstrip 5, so that the roll is released from the looseness prevention of the lips 41. The thickness D (see FIG. 4) of the flanges 7 and 8 is determined to be 0.3 mm so that even a comparatively small force can spread the flanges 7 and 8. To achieve this effect, the thickness D may be 0.4 mm or smaller.

Figure 5:
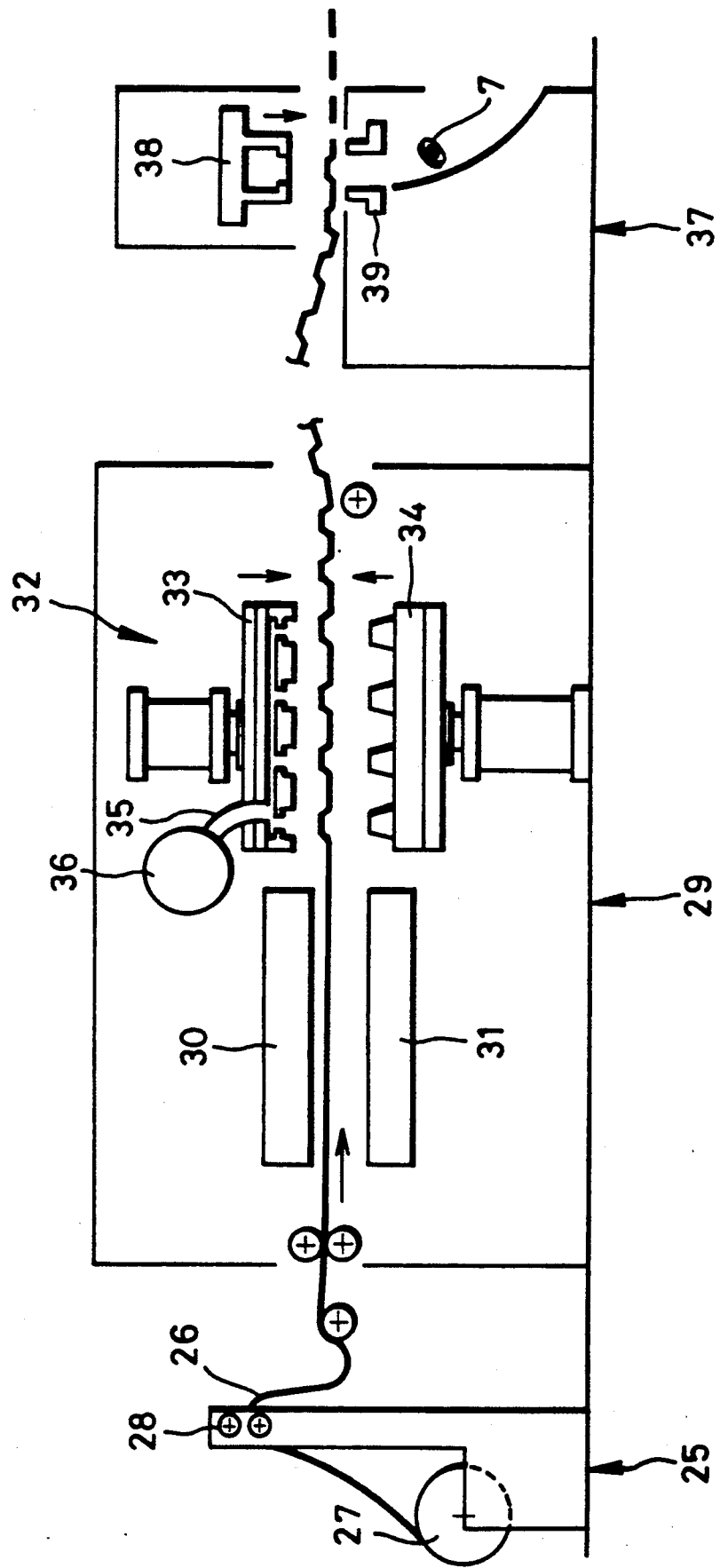
FIG. 5 is a schematic view illustrating a system for producing the flange illustrated in FIG. 3.

FIG. 5 illustrates a process of producing the flanges. A roll 27 of a continuous sheet 26 of polyethylene having the thickness of 0.3 mm is stored in a sheet feeder 25. To ensure the adequate intensity of the flanges 7 and 8, the polyethylene sheet 26 is constituted of high-density polyethylene having a melt index (MI) of at most 4, which index indicates flowability of resin. The melt index of resin is herein a value which decreases as the intensity of the resin increases. The polyethylene sheet 26 is fed by rollers 28 to a vacuum forming machine 29, and heated for 8 seconds by a pair of heaters 30 and 31 disposed in the forming machine 29. The polyethylene sheet 26, which is softened as it is heated up to 180° C., is fed to a forming section 32 in the forming machine 29. A pair of form molds 33 and 34 are disposed in the forming section 32. The upper form mold 33, which has the cavity, is provided with a suction hose 35, which in turn is connected to a vacuum pump 36. When the upper form mold 33 is lowered until it reaches the polyethylene sheet 26, the polyethylene sheet 26 is sucked by the vacuum pump 36 and stuck on the upper form mold 33. The lower form mold 34, which has the plug, is then raised and presses the polyethylene sheet 26 against the upper form mold 33. While pressed by the lower form mold 34, the polyethylene sheet 26 is sucked for 5 seconds. Although the polyethylene sheet 26 is pressed between the form molds 33 and 34 for improving efficiency after being heated in the present producing process, the lower form mold 34 may be omitted for reducing the cost of preparing the form molds. Although the polyethylene sheet 26 is subjected to vacuum forming, it may also be subjected to a different method of thermoforming such as air-pressure forming, heat-press forming or cold-press forming. Cold-press forming is a thermoforming process under the condition wherein the thermoplastic sheet is heated up to 100° C. or less, and the mold die is heated up to 50° C. or less.

The polyethylene sheet 26 is cooled for 5 seconds in this state, and fed into a blanking machine 37, which is comprised of movable and stationary cutting dies 38 and 39. The flanges 7 and 8 having the thickness of 0.3 mm are blanked out of the polyethylene sheet 26 in the blanking machine 37, while at the same time the holes 40 are punched in the flanges 7 and 8. By way of the thermoforming process as described above, the product can be formed at a small and uniform thickness, as small as 0.1 mm, without lowering production efficiency. Although the flanges 7 and 8 are formed from the polyethylene sheet 26 of a single sheet, they also may be formed from a continuous sheet which is a lamination of a plurality of layers. Although the flanges 7 and 8 are formed from the polyethylene sheet 26, they may be formed from a continuous sheet of polystyrene, polyvinyl chloride, polypropylene, polycarbonate, or ABS resin.

When an additive and a lubricant are added to the polyethylene sheet 26, the friction between the filmstrip 5 and the lips 41 can be further reduced. Examples of the additive are fluorine powder, silicone oil, carbon fiber, molybdenum disulfide, graphite, and potassium titanate. Examples of the lubricant are silicone oil, higher fatty acid amides such as oleic acid amide and erucic acid amide, metallic salts of higher fatty acid amide such as zinc stearate, higher alcohol ester, and fatty acid ester of polyvalent alcohol ester.

The operation of the above cassette is now described. The core 6 is rotated in a direction to unwind the filmstrip 5 by an initial advance mechanism of a camera when the camera is loaded with the cassette. As the lateral sides of the outermost turn of the roll are in contact with and covered by the lips 41, rotation of the core 6 is transmissible to the leading end. The leading end is rotated clockwise in FIG. 1 together with the roll. The rotation of the roll is transmitted to the flanges 7 and 8 via the lips 41. During the rotation of the flanges 7 and 8, the collars 42a are in contact with the spreaders 16 and 17, which, however, never increase the torque to rotate the core 6, because the thickness of the flanges 7 and 8 is small enough to allow easy deformation of the flanges.

Further rotation of the core 6 brings the leading end in contact with the separating claw 18 which separates the leading end from the inner roll. The flanges 7 and 8 are now deformed by the spreaders 16 and 17, which release the lateral sides of the filmstrip 5 from the contact with the lips 41. The leading end is slid on the upper surface of the separating claw 18 and advanced to the outside of the cassette through the passageway 15.

Experiments were conducted with respect to cassettes having the inventive spool and also having the conventional spool. The inventive spools were provided with flanges 7 and 8 which were 0.3 mm thick and were vacuum formed from polyethylene, polypropylene, polyvinyl chloride and polystyrene. The conventional spool had flanges 0.5 mm thick which were molded using an injection molding process. These cassettes are compared as to the torque needed for advancing the leader of the filmstrip, manufacturing cost, and abnormal noise produced during leader advancement. Based on the results of the experiments, the inventive spools having the flanges of any of the above materials were superior to the conventional flanges, i.e., the inventive spools exhibited a low torque, a low cost, and a low noise.

Figure 6:
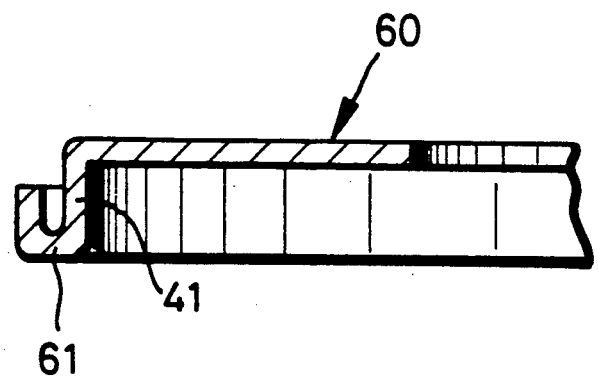
FIGS. 6 to 8 are sections illustrating important portions of inventive flanges according to other preferred embodiments.
Figure 7:
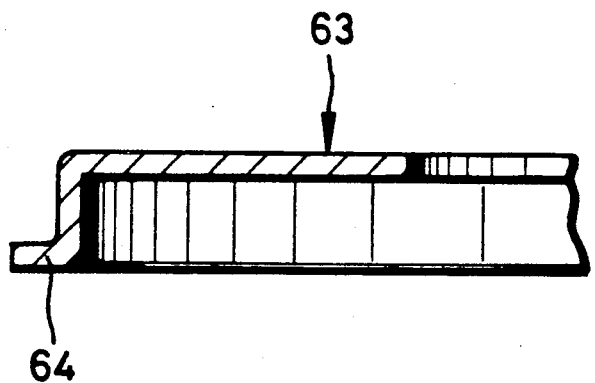
Figure 8:
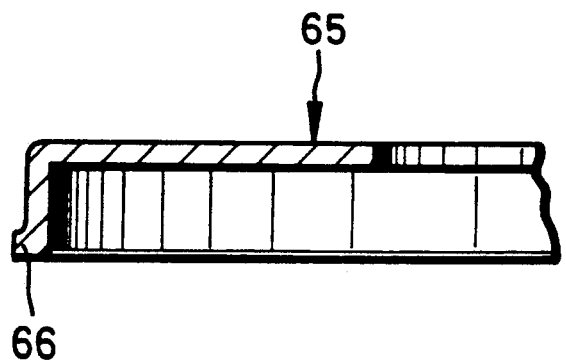

FIGS. 6 to 8 illustrate other preferred embodiments of the flanges of the spool. In FIG. 6, a flange 60 is provided with a circumferential projection 61 around the edge of the lip 41. The projection 61 is in the shape of a letter L in cross section, and defines the shape of a letter U or a channel together with the lip 41. The spreader 16, 17 comes in contact with the radial portion of the projection 61 to spread the flange 60 outwardly. In FIG. 7, a flange 63 is provided with a circumferential projection 64 around the edge of the lip 41. The projection 64 projects in the direction along the radius of the flange 63, and defines the shape of a letter L together with the lip 41 in cross section. The spreader 16, 17 comes in contact with the projection 64 to spread the flange 63 outwardly. FIG. 8 illustrates a projection 66 which radially projects from the lip 41 of a flange 65 in a manner similar to the projection 64, but is not as long as the projection 64.

Figure 9:
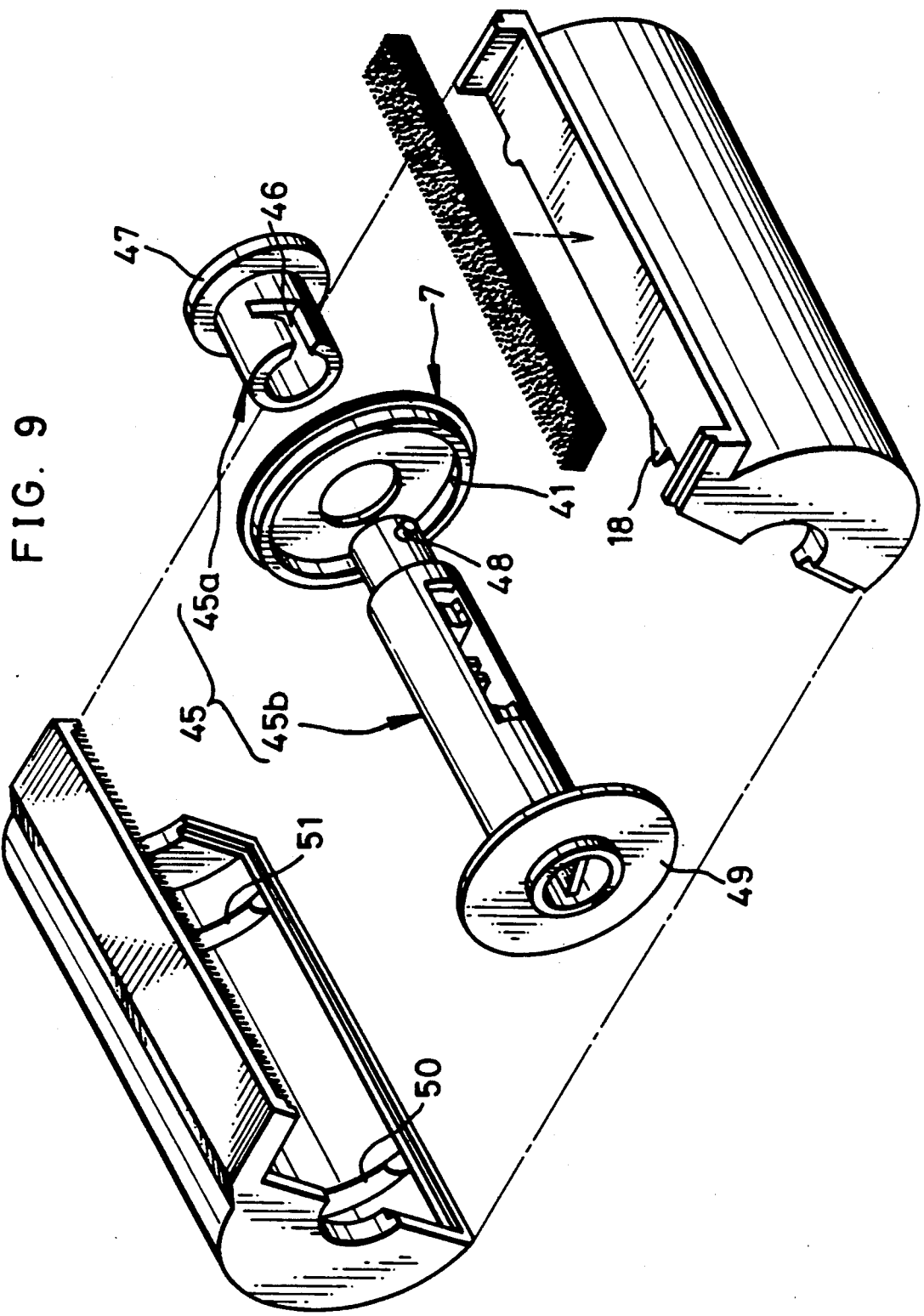
FIG. 9 is an exploded perspective view illustrating a cassette according to another preferred embodiment of the present invention.

Referring to FIG. 9 illustrating another preferred embodiment of the present invention, a spool 45 is composed of outer and inner spool pieces 45a and 45b which are axially fitted together to be slidable with each other. In the spool piece 45b is anchored the trailer of the filmstrip 5. The outer spool piece 45a is provided with a cam groove 46 on the core portion, and an adhering portion 47 on the lateral end. The adhering portion 47 is adhered to the flange 7 by use of adhesive agent. On the core portion of the inner spool piece 45b is integrally formed a cam follower 48 to be fitted in the cam groove 46. A flange 49 is integrally formed on the lateral end of the inner spool piece 45b. The flange 49 lacks a circumferential lip. The circumferential lip 41 of the flange 7 prevents the right side of the outermost turn of the roll from loosening, the outermost turn being easily separable from the inner roll by the use of the separating claw 18 situated on the side opposite to the lip 41. Reference numerals 50 and 51 designate annular ridges for contact with the roll to keep its diameter from exceeding the inner diameter of the lip 41.

In the cassette having the spool 45, clockwise rotation of the outer spool piece 45a causes the cam groove 46 and the cam follower 48 to interact to insert the inner spool piece 45b deeper in the outer spool piece 45a. The roll is clamped by the two flanges 7 and 49. The rotation of the inner spool piece 45b in the direction of unwinding the filmstrip 5 brings the turns of the roll outwardly tight so that the roll is held integrally with both spool pieces 45a and 45b. The outermost turn of the roll becomes movable following movement of the core of the spool 45. The lip 41 is fitted on the right end of the roll to prevent it from loosening from outside the roll. When the outer spool piece 45a is rotated in the unwinding direction, the rotation is transmitted to the leader, which rotates in this direction together with the spool 45. The left side of the leader is free from the lip 41, so that the leading end is separated from the inner roll. When the outer spool piece 45a is shifted to shorten the spool 45, the lip 41 abuts a spreader, similar to the spreader 17 illustrated in FIG. 1, and is spread thereby. As the flange 7 having the lip 41 is easily deformable, the torque to rotate the spool 45 will never increase excessively.

Figure 10:
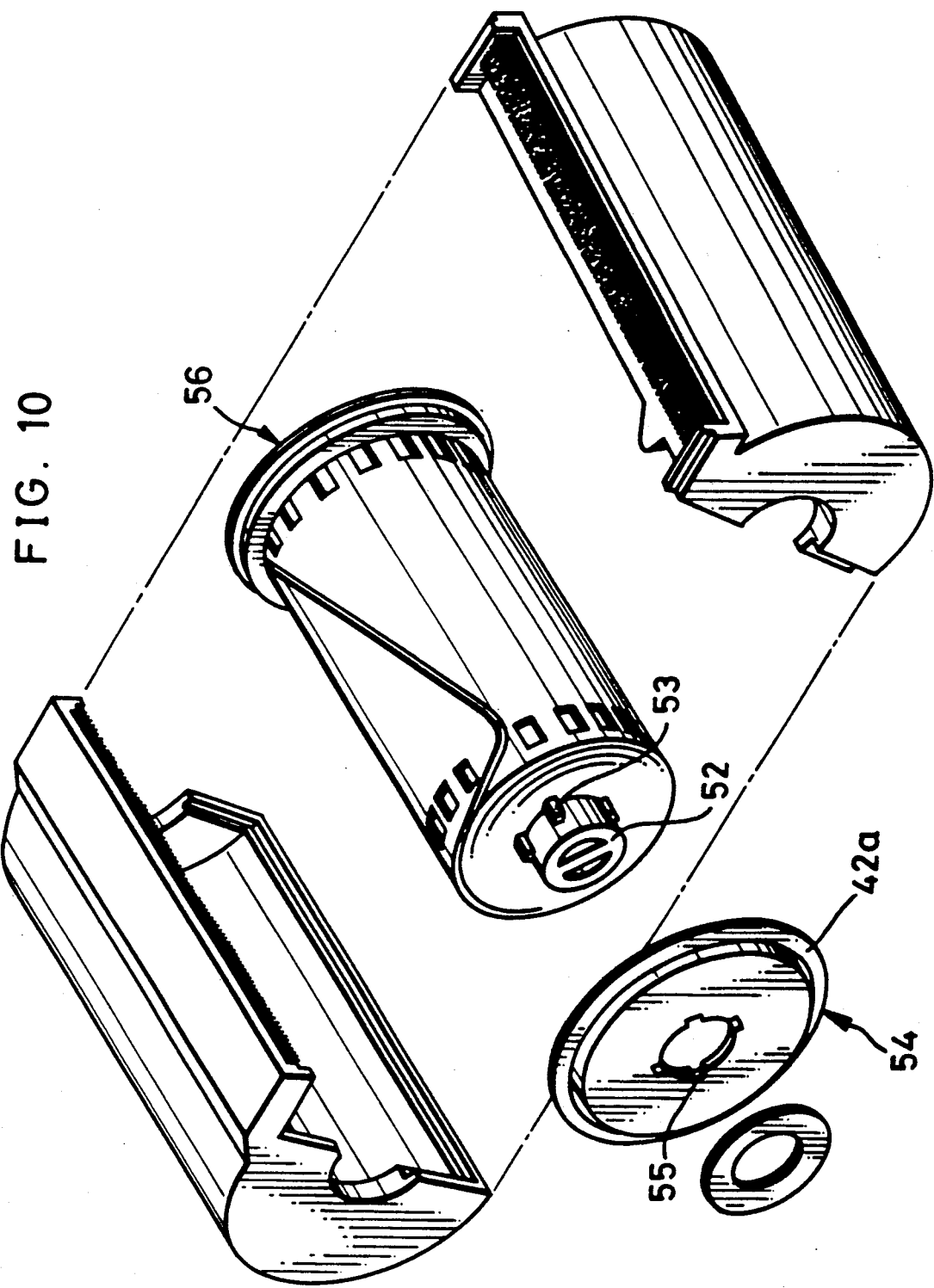
FIG. 10 is an exploded perspective view illustrating a cassette according to still another preferred embodiment.

In FIG. 10 illustrating a cassette according to still another preferred embodiment, both ends of a core 52 of the spool are provided with four projections 53 integrally formed and arranged in a cross pattern. In this drawing, only the projections on the left end of the core 52 are shown. Four recesses 55 are formed in the bearing holes of flanges 54 and 56 for receiving the core 52 in correspondence with the four projections 53. In a cassette thus constructed, the projections 53 are fitted in the recesses 55 when the core 52 is inserted in the flanges 54 and 56. Therefore, rotation of the core 52 is transmitted without fail to the flanges 54 and 56.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A photographic film cassette comprising:
   a spool for winding a photographic filmstrip in a roll, said spool having a core, said roll of said photographic film having an outermost turn with lateral sides and having a photographic film leader;
   a cassette shell having a photographic film chamber in which said spool is rotatably contained;
   a first flange loosely fitted on said core of said spool at one end of said spool, said first flange including an inside surface;
   a second flange provided at another end of said spool;
   a first circumferential lip projecting from said inside surface of said first flange toward said roll for contact with one of the lateral sides of the outermost turn of said roll so as to prevent said roll from loosening; and
   means for advancing the photographic film leader of said roll toward an outside of said cassette shell by releasing said photographic film leader from said first circumferential lip when said core is rotated;
   wherein said first flange together with said first circumferential lip are thermoformed from a sheet of thermoplastic resin having a melt index of 4 or less so as to have a high intensity, and said first flange has a thickness of 0.4 mm or less so as to be deformable with a small force.

2. A photographic film cassette as claimed in claim 1, wherein said first flange is formed by vacuum forming.

3. A photographic film cassette as claimed in claim 2, wherein said thermoplastic resin sheet is a polyethylene sheet.

4. A photographic film cassette as claimed in claim 3, wherein said thermoplastic resin sheet includes at least one kind of lubricant.

5. A photographic film cassette as claimed in claim 1, wherein said cassette shell comprises two shell halves molded from resin.

6. A photographic film cassette as claimed in claim 5, wherein said cassette shell has a photographic film passageway and a photographic film passage mouth, and wherein said leader-advancing means comprises a separating claw, provided in a position between said film chamber and said photographic film passageway, for separating said photographic film leader from said roll so as to direct said photographic film leader toward said photographic film passage mouth.

7. A photographic film cassette as claimed in claim 6, wherein:
   said second flange is loosely fitted on said core and includes an inside surface;
   said second flange has a second circumferential lip which projects from said inside surface of said second flange toward said roll for contact with another of the lateral sides of the outermost turn of said roll so as to prevent said roll from loosening; and wherein said second flange together with said second circumferential lip is formed according to thermoforming from a sheet of thermoplastic resin having a melt index of 4 or less so as to have a high intensity, and has a thickness of 0.4 mm or less so as to be deformable with a small force.

8. A photographic film cassette as claimed in claim 7, wherein said leader-advancing means further includes photographic film releasing means provided in said cassette shell for partially spreading said first and second flanges in a widthwise direction of said filmstrip apart from said roll so as to release said first and second circumferential lips from preventing the loosening of said roll.

9. A photographic film cassette as claimed in claim 8, wherein said first and second circumferential lips each have edge portions, an inside of said edge portions being rounded off.

10. A photographic film cassette as claimed in claim 9, wherein said edge portions of said first and second circumferential lips have circumferential projections which project from said edge portions in a radial direction of said first and second flanges.

11. A photographic film cassette as claimed in claim 9, wherein said edge portions of said first and second circumferential lips have circumferential projections which project from said edge portions so as to define a shape of a channel in a cross section.

12. A photographic film cassette as claimed in claim 9, wherein said edge portions of said first and second circumferential lips have circumferential projections which project from said edge portions so as to define a shape of a crank in a cross section.

13. A photographic film cassette as claimed in claim 12, further comprising:
N recesses formed in connection with respective bearing holes formed in said first and second flanges; and
N projections provided on said core at its respective ends for receiving said N recesses when fitting said first and second flanges on said core so as to transmit rotation of said core to said first and second flanges;
wherein N equals a predetermined number.

14. A photographic film cassette as claimed in claim 13, wherein N=4.

15. A photographic film cassette as claimed in claim 12, wherein said film chamber includes lateral walls having arcuate ridges formed on the lateral walls, in a position opposite to said photographic film releasing means, for pressing said first and second flanges against said roll.

16. A photographic film cassette as claimed in claim 15, wherein said photographic film releasing means comprises two spreading projections each formed in a triangular shape.

17. A photographic film cassette as claimed in claim 16, further comprising rings fitted on said core outwardly from said first and second flanges, respectively, for preventing light from being incident through bearing holes, formed in said cassette shell, for supporting said core.

18. A photographic film cassette as claimed in claim 17, wherein an end of said photographic film leader is cut slantwise so as to project a side thereof corresponding to said separating claw.

19. A photographic film cassette as claimed in claim 6, wherein said spool comprises:
A) a first spool piece on which said first flange is fitted; and
B) a second spool piece having said second flange formed thereon, being slidably fitted on said first spool piece; and
said leader-advancing means comprises:
a) looseness preventing means provided in said cassette shell for contacting said outermost turn of said roll to prevent said roll from loosening; and
b) movement transmitting means for causing said two spool pieces to slide relative to each other in an axial direction to shorten said spool when rotating said spool so as to bring said first and second flanges closer to each other, thereby clamping said photographic film leader with said first and second flanges so as to make said photographic film leader follow movement of said spool.

20. A photographic film cassette as claimed in claim 19, wherein:
said looseness preventing means comprises annular ridges formed on a cylindrical surface of said film chamber so as to project toward said roll; and
said movement transmitting means comprises a cam follower provided on said second spool piece, and a cam groove formed in said first spool piece for receiving said cam follower in order to cause said first and second spool pieces to slide relative to each other in cooperation with said cam follower so as to shorten said spool when said first spool piece is rotated relative to said second spool piece in a direction of unwinding said filmstrip.

21. A photographic film cassette as claimed in claim 20, said first spool piece is adapted to be engaged with a rotary member in a camera to rotate said spool.

22. A photographic film cassette as claimed in claim 21, wherein:
said first spool piece has a hollow bore formed therein; and
said second spool piece includes a core portion for being inserted in said hollow bore.

23. A photographic film cassette as claimed in claim 22, wherein said first spool piece comprises a pressing portion disposed outwardly from said first flange for pressing said first flange against said roll when said first and second spool pieces are slid relative to each other.

24. A photographic film cassette as claimed in claim 23, wherein said separating claw is disposed in a position near said second flange with reference to a lengthwise direction of said cassette shell.

25. A photographic film cassette as claimed in claim 24, wherein a trailer of said filmstrip is anchored on said second spool piece.

26. A photographic film cassette as claimed in claim 25, wherein an end of said photographic film leader is cut slantwise so as to project a side thereof corresponding to said separating claw.

* * * * *